DISC RECORD CARRIER

Filed March 11, 1971 2 Sheets-Sheet 1

INVENTOR,
CHARLES H. PERRY

BY

COHEN & LISS
ATTORNEYS

DISC RECORD CARRIER

Filed March 11, 1971 2 Sheets-Sheet 2

INVENTOR,
CHARLES H. PERRY
BY
COHEN & LISS
ATTORNEYS 3,717,297

DISC RECORD CARRIER

Charles Hamilton Perry, Washington, D.C., assignor to Creative Posters, Inc., Kensington, Md.

Filed Mar. 11, 1971, Ser. No. 123,306
Int. Cl. B65d 85/30
U.S. Cl. 229—72 5 Claims

ABSTRACT OF THE DISCLOSURE

A paper blank includes a central section having a transversely positioned center fold line which allows the central section to be divided into two overlying parts hingedly connected by the center fold line. Flaps formed in the blank are turned inwardly toward the interior confronting surfaces of the divided central section parts to produce side by side envelopes. The outward end portions of the central section have handle means formed therein to facilitate carrying.

FIELD OF THE INVENTION

The present invention relates to envelopes for phonograph records and is more particularly directed to an envelope structure having self contained carrying handles.

THE PRIOR ART

During the present time, smaller phonograph records of the 45 r.p.m. variety are distributed in flimsy paper jackets that are neither aesthetically pleasing nor protective of their contents. Usually, the jacketed phonograph record is placed in a bag after sale. This additional covering does not overcome the problems attendant with the original paper jacket. Accordingly, it would be highly desirable to distribute smaller phonograph records in a compact sturdy container or envelope which also allows handle carrying.

SUMMARY OF THE INVENTION

The present invention generally resembles two hingedly mounted envelopes having upper extensions that are juxtaposed to allow the formation of handle means therein. The present record carrier can be easily fabricated from a single paper blank having score lines formed therein to define articulating flaps that are made to overly each other to form record carrying pockets.

The two hingedly connected envelope sections come together to create a fairly rigid container or carrier for phonograph records. By forming cuts in the envelope section extensions, handle means are formed to allow convenient and easy carrying of two smaller phonograph records. However, it should be emphasized at this point that the present invention can be modified so as to permit the carrying of only a single phonograph record. This is simply achieved by fabricating a single envelope section.

A further advantage of the present invention resides in relatively clean exterior surfaces that facilitate the printing of ornamentation thereon, such as pictures of popular recording stars, the name of a record shop where the records are purchased, or other commercial printing.

Record pockets are formed by flaps that articulate from the lateral edges of a blank central section. The flaps are arranged in a manner resulting in a neat flat package when the envelope sections are folded together. Also, the particular flap arrangement set forth with particularity hereinafter creates a record carrier of minimum width. That is to say, that excessively large glued seams along lateral edges of the record carrier are not necessary. Thus, the present construction lends itself to compact packaging.

BRIEF DESCRIPTION OF THE DRAWINGS

Many objects and advantages of the present invention will appear from the following detailed description of illustrative embodiments of the invention, in the course of which reference is had to the accompanying drawings, in which.

DESCRIPTION OF THE INVENTION

Figures 1, 5:
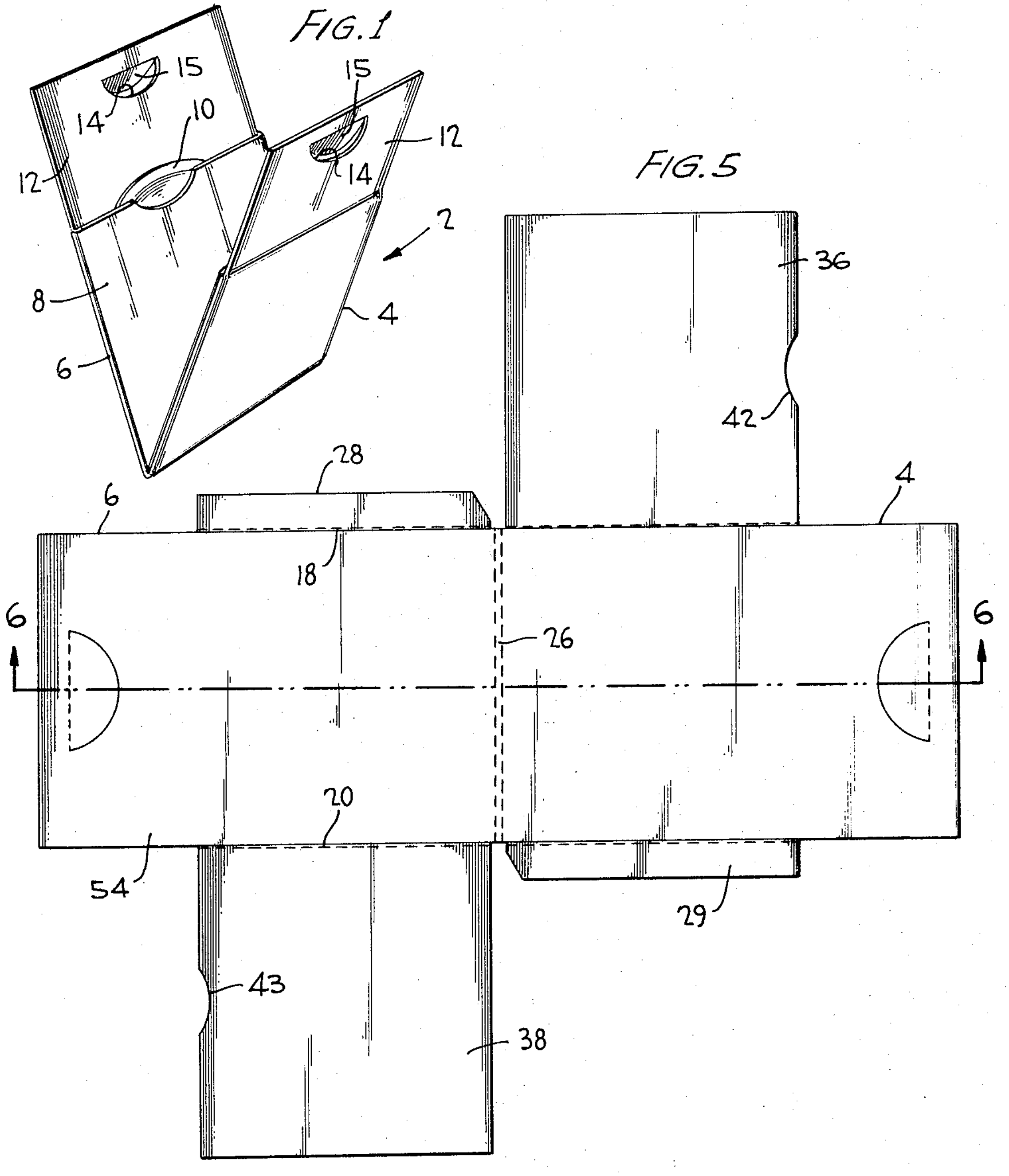
FIG. 1 is a perspective view illustrating the present phonograph record carrier in a partially opened position exposing an inserted phonograph record therein.
FIG. 5 is a plan view similar to that of FIG. 2 but indicative of a second form of the invention.

Referring to the drawings and initially FIG. 1, there is illustrated a carrier for phonograph records generally resembling two envelope sections hingedly connected along a common edge. Pockets are formed on the inside of the sections to allow insertion of phonograph records therein.

Figures 2, 3, 4:
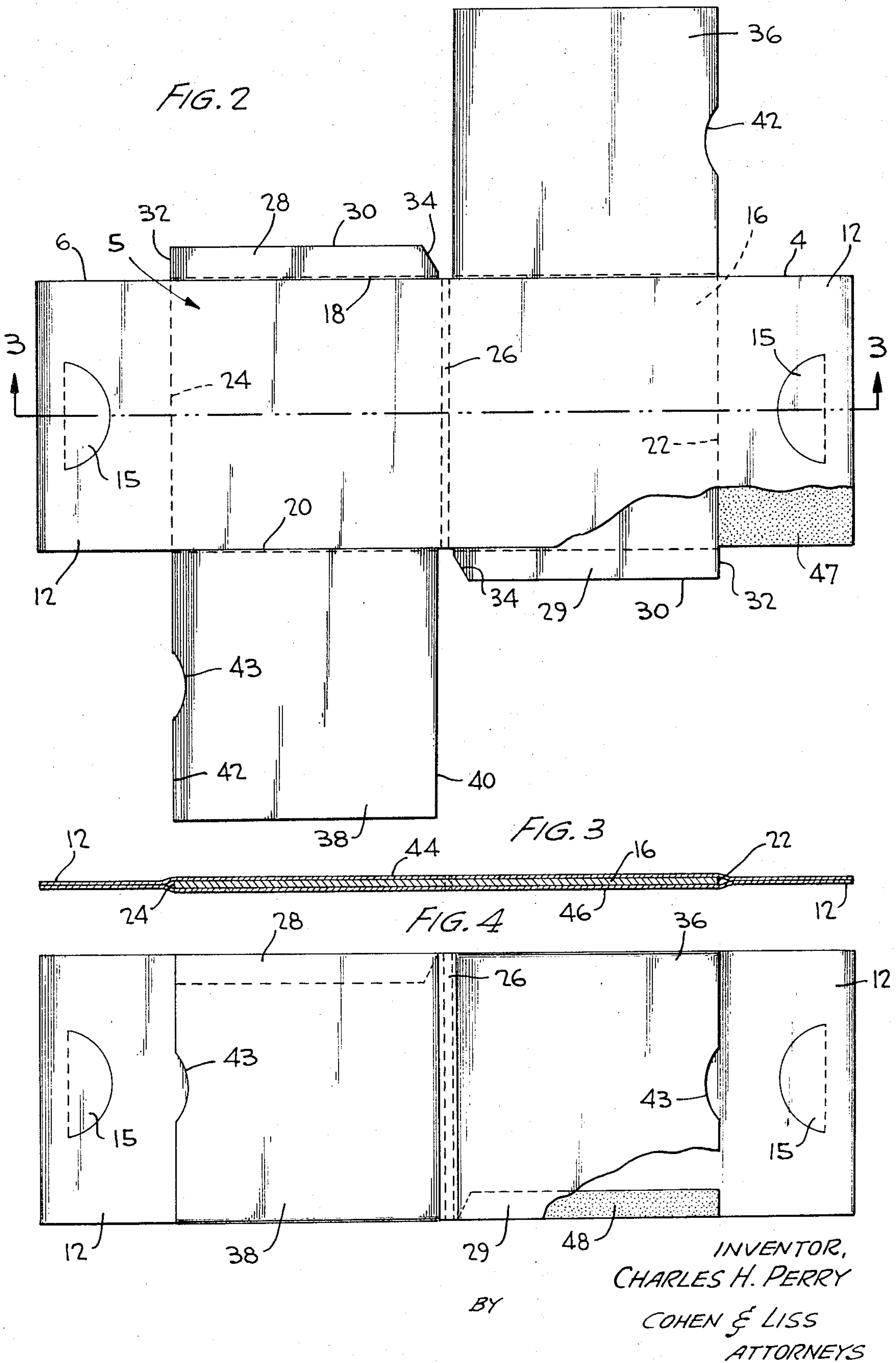
FIG. 2 is a plan view of a blank which forms a first embodiment of the present invention.
FIG. 3 is a longitudinal sectional view illustrating the laminated structure of the embodiment shown in FIG. 2. This view is taken along a plane passing through section line 3—3.
FIG. 4 is a plan view of the structure shown in FIG. 2 with the articulating flaps folded together.

In greater detail, the carrier shown in FIG. 1 is generally indicated by reference numeral 2 and the envelope sections have identical base sections 4 and 6. As seen in FIG. 2, reference numeral 5 generally indicates the rectangular portion which is made up from base sections 4 and 6. This rectangular portion is referred to as a central section of the blank from which the final phonograph record carrier 2 is made.

Panels 8 are attached to the confronting interior sides of the base sections 4 and 6. As clearly shown in FIG. 1, the pocket panel 8 receives a phonograph record 10. As will be further noted from inspecting FIG. 1, the base sections 4 and 6 extend beyond the pocket panels 8 to form extensions 12. The extensions 12 have semi-circular slits 14 which leave semi-circular tongues 15. These tongues may be either removed or left hingedly connected to the extensions 12. In any event, by passing one's fingers through the semi-circular slits 14, a convenient carrying handle is formed.

In a first form of the invention, as illustrated in FIG. 2 a laminate exists with the centrally positioned sheet 16 having lateral edges 18 and 20. The transverse edges of this sheet are indicated by 22 and 24. In a preferred fabrication of the present record carrier, the central sheet 16 is made from cardboard. As will be noted from FIG. 2, a center folding line 26 is positioned in midway parallel spaced relation to the transverse edges 22 and 24.

Between the left transverse edge 24 and the center fold line 26 is an articulating flap 28 that is hingedly connected to the remaining body of the central sheet 16 along a score line that is formed co-linearly with the lateral edge 18. The outward lateral edge of flap 28 is straight and is denoted by reference numeral 30. A transverse edge 32 of flap 28 is formed in transverse alignment with the edge 24 of the central sheet 16. The other transverse edge 34 is angularly cut so as to prevent bunching of material in the vicinity of the center fold line 26 when the carrier is used.

A second larger flap 38 articulates from the lateral edge 20 of the central sheet 16. This flap has transverse edges 40 and 42 respectively aligned with corresponding edges 34 and 32 on flap 28. However, it should be noted that a semi-circular slot 43 is formed in edge 42 for the purpose of faciliting grasping of a phonograph record 10 once it is inserted in pocket as shown in FIG. 1.

As illustrated in FIG. 2, an opposite orientation of small flap 28 and large flap 38 exists on the opposite side of the center folding line 26. The counterparts to flaps 28 and 38 are 29 and 36, respectively.

Referring to FIG. 3, the central sheet 16 is seen to be sandwiched between a top covering sheet 44 and a bottom covering sheet 46 which is suitably attached to the central sheet 16 to form a laminated structure. As evidenced in FIG. 3, the covering sheets 44 and 46 extend longitudinally beyond the transverse edges 22 and 24 of the central sheet 16. Referring back to FIG. 2, a proper adhesive layer 47 is seen to connect the overlapping sheets 44 and 46, the attached portions of these cover sheets forming the extensions 12 previously referred to. By foreshortening the central sheet 16, the most economical construction can be realized. In addition, the relatively flexible extensions 12, fabricated from the attached sheets 44 and 46, provide carrying comfort.

In order to form the pockets for the phonograph records, the smaller flaps 28 and 29 are folded downwardly toward the body of the blank. After being folded, the exposed side is covered with a suitable sealing material such as adhesive 48 shown in FIG. 4. Then, correspondingly larger flaps 38 and 26 are folded into adhering relation with their respective smaller flaps. By laterally alternating the joint between larger and smaller flaps, relative to section line 3—3, the envelope sections of the carrier can be folded together into a compact and flat package. Also, the particular way that the flaps are attached insures that both lateral edges of the folded record carrier have maximum rigidity which protects the enclosed phonograph records.

Figure 6:
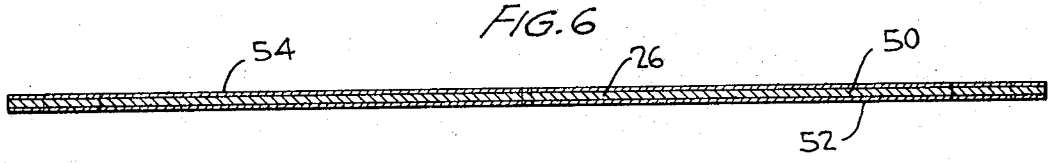
FIG. 6 is a longitudinal sectional view similar to that shown in FIG. 3 and taken along a plane passing through section line 6—6 of FIG. 5.

The second embodiment of the present invention is clearly illustrated in FIGS. 5 and 6. Essentially, the second embodiment there illustrated is identical to the construction shown in FIGS. 2–4 with one principal exception. That exception will become obvious when studying FIG. 6 which shows the inclusion of a single central sheet 50 that extends along the entire length of the blank. Cover sheets 52 and 54 are applied in sandwiching relation to the central sheet 50 to form a laminate structure. Thus, the principal characteristic of the second embodiment is that the thickness of the blank is uniform as opposed to varying thickness as in the first embodiment (FIG. 3). An advantage of the second embodiment resides in the rigidity of the handle portion.

Preferences between the first and second embodiments depend upon final fabrication costs and consumer appeal. In either embodiment, the exterior and interior surfaces are amenable to ornamental printing and advertising.

While the present invention has been illustrated and described in connection with certain illustrative embodiments, the invention is not limited to details described, except insofar as set forth in the accompanying claims. Various other embodiments and modifications can be devised by those skilled in the art that will fall within the spirit and scope of the present invention.

What is claimed as new and desired to be secured by Letters Patent of the United States is:

1. A container blank comprising a central section having a center fold line, a relatively small flap articulating laterally outwardly from an edge of the section at one side of the center fold line, a relatively large flap articulating laterally outwardly from an opposite edge of the section in generally transverse alignment with the small flap, an oppositely arranged pair of small and large flaps articulating laterally outwardly from the central section at the other side of the center fold line, each large flap being capable of overlying connection with a corresponding transversely aligned small flap nearbly to form a pocket, the oppositely arranged flap pairs enabling compact flap folding of the central section along the center fold line.

2. The structure set forth in claim 1 wherein at least one sheet is connected to the central section, the sheet extending longitudinally outwardly beyond the transverse end edges of the central section, opposite end portions of the sheet becoming juxtaposed when the central section is folded along the center fold line, and handle means formed in the opposite end portions of the sheet to facilitate carrying.

3. The structure set forth in claim 2 wherein two parallel spaced sheets are connected to the central section, the sheets being attached to each other along points beyond the transverse end edges of the central section.

4. The structure set forth in claim 1 wherein the central section extends longitudinally outwardly beyond the flaps to form extensions, and handle means formed in the extensions to facilitate carrying when the flaps are connected and the central section is folded along the central fold line.

5. The structure defined in claim 4 wherein the central section is made of a laminated structure including an intermediate layer of thickened material and parallel spaced layers covering both sides of the intermediate layer.

References Cited

UNITED STATES PATENTS

| | | | |
|---|---|---|---|
| 1,627,583 | 5/1927 | Thum | 229—52 B UX |
| 761,912 | 6/1904 | Rheutan | 229—69 UX |
| 3,522,907 | 8/1970 | Utterback | 229—68 R |
| 3,077,263 | 2/1963 | Froehlig | 206—62 P |

FOREIGN PATENTS

| | | | |
|---|---|---|---|
| 126,917 | 12/1949 | Sweden | 229—52 B |

DONALD F. NORTON, Primary Examiner

U.S. Cl. X.R.

229—52 B